United States Patent [19]  
Mundt et al.

[11] Patent Number: 4,678,525  
[45] Date of Patent: Jul. 7, 1987

[54] PROCESS OF MANUFACTURING SLIDE FRAMES

[75] Inventors: Peter Mundt, Garmisch-Partenkirchen; Arnold Neuhold, Farchant, both of Fed. Rep. of Germany

[73] Assignee: Geimuplast Peter Mundt GmbH. & Co. KG., Farchant, Fed. Rep. of Germany

[21] Appl. No.: 729,119

[22] Filed: Apr. 30, 1985

[30] Foreign Application Priority Data

May 7, 1984 [DE] Fed. Rep. of Germany ....... 3416760  
May 7, 1984 [DE] Fed. Rep. of Germany ....... 3416761

[51] Int. Cl.$^4$ .................. B29C 65/08; G09F 1/12  
[52] U.S. Cl. ..................... 156/73.1; 40/154; 40/158 B; 156/108; 156/209; 156/219; 156/244.18; 156/244.19; 156/252; 156/264; 156/267; 156/514; 264/284; 264/293; 264/294  
[58] Field of Search .............. 156/73.1, 108, 209, 156/219, 244.18, 244.19, 252, 264, 267, 580.1, 513, 514; 40/154, 158 B; 264/241, 284, 293, 294, 245

[56] References Cited  
U.S. PATENT DOCUMENTS

| 2,390,053 | 12/1945 | Bradford | 40/152 |
| 2,527,765 | 10/1950 | Roehrl | 156/108 |
| 2,849,752 | 9/1958 | Leary | 264/284 |
| 3,126,621 | 3/1964 | Thieme et al. | 156/108 |
| 3,992,243 | 11/1976 | Berggren et al. | 156/108 |
| 4,053,340 | 10/1977 | Work | 264/293 |
| 4,250,641 | 2/1981 | Thompson | 40/158 B |
| 4,467,541 | 8/1984 | Pettersson | 40/158 B |
| 4,477,991 | 10/1984 | Drevitch et al. | 40/158 B |

FOREIGN PATENT DOCUMENTS

276804 12/1969 Austria .  
1214898 4/1966 Fed. Rep. of Germany .

Primary Examiner—Michael Wityshyn  
Attorney, Agent, or Firm—Fleit, Jacobson, Cohn & Price

[57] ABSTRACT

A process of manufacturing slide frames is disclosed, which are preferably adapted to be elastically expanded and are made from at least one extruded plastic sheet plastic web. Plastic web portions are adhesively joined or joined by ultrasonic welding to form a frame and picture gates and punching operations are performed to form picture gates in the frame and to form the external contour of the frame. A film bed which serves to receive a slide and is preferably peripherally closed is formed by embossing.

21 Claims, 31 Drawing Figures

PROCESS OF MANUFACTURING SLIDE FRAMES

BACKGROUND OF THE INVENTION

1. Field of the Invention

This invention relates to a process of manufacturing slide frames which are preferably adapted to be elastically expanded and are made from at least one extruded plastic sheet plastic web, wherein plastic web portions are adhesively joined or joined by ultrasonic welding to form a frame and picture gates and punching operations are performed to form picture gates in the frame and to form the external contour of the frame.

2. Description of the Prior Art

In a known process of that kind the frame is made in that three sheets of extruded plastic are adhesively joined. The intermediate sheet is formed with a punched film bed for holding the slide. The sheets are first punched to form the picture gates and the film bed and are then adhesively joined and finally punched to form their outer edges. In the known process the processing of three plastic sheets requires a rather expensive apparatus comprising three supply rolls, three pairs of pinch rollers, two joining devices and one printer. The apparatus is succeeded by a packaging apparatus for packaging the slide frames in shrink film. The known process is complicated because the slide frames are made from three webs of sheet plastic.

SUMMARY OF THE INVENTION

It is an object of the invention so to simplify the known process that the frames can be made at lower cost.

In accordance with a first aspect of the invention the object set forth is accomplished in that a film bed which serves to receive a slide and is preferably peripherally closed is formed by embossing, or in that a single plastic web is extruded and is subsequently embossed to form the film bed and a film hinge connecting two components of the frame and the picture gates and the external contour of the frame are subsequently formed by punching, preferably at the same time.

The advantage afforded by the process in accordance with the invention resides in that the slide frame can be made from two plastic sheets or even from a single plastic sheet. As a result, the process in accordance with the invention can be carried out by a less expensive production line or by less expensive plant comprising a plurality of production lines. The process in accordance with the invention may be carried out on plants comprising eight or more production lines, which may be arranged one beside another and/or one behind another. A plastic slide frame made by the process in accordance with the invention will be competitive in manufacturing costs with one made of cardboard. The production rate which can be achieved with the process in accordance with the invention is higher than the rate at which known one-part or two-part plastic slide frames can be made by injection molding because the moldings have only such a small wall thickness that the production rate cannot be increased as highly as in the process in accordance with the invention.

The process in accordance with the invention affords the following advantages over the making of the known two-part plastic frames by injection molding: Energy is saved because the high pressures to be applied in injection molding machines requires a high energy. Labor is also saved because the process in accordance with the invention is performed in continuous operation. The steps of transferring the components of the frame from the injection molding machine to the welding machine and the charging of the components of the frame into the magazines of the welding machine are eliminated. Besides, there is no need for an intermediate storage to permit an inspection of the slide frames before they are packaged. The process in accordance with the invention can be made on a compact plant and the slide frames need not be manually handled before they have been packaged.

In a preferred embodiment of the invention, the film bed is formed by cold embossing.

In that embodiment it is not necessary to preheat the plastic sheet or sheets and the embossing punch may be incorporated in the punching tool.

In a preferred embodiment of the invention, the film bed and/or the film hinge are formed by hot embossing.

The advantage afforded by that embodiment resides in that the frame can be formed by embossing with any desired contour, which may be known from plastic slide frames made by injection molding. The frame made in that manner will have smooth surfaces on both sides.

In a preferred embodiment of the invention the external contour is formed in a rounded shape by an embossing operation.

The advantage afforded by that embodiment resides in that during the transfer of slide frames from the magazine into the projector an interlocking of adjacent slide frames at their external contours will be prevented. Another advantage resides in that with a bag of plastic film used to receive a slide frame made in accordance with the invention will not be damaged by sharp edges of the slide frame.

In a preferred embodiment of the invention an edge of a picture gate is formed with a step by an embossing operation.

The advantage afforded by that embodiment resides in that two adjacent slide frames moving relative to each other cannot interlock at their picture gates.

In a preferred embodiment of the invention a script is formed by an embossing operation.

The advantage afforded by that embodiment resides in that the printer required in the known process can be eliminated.

In a preferred embodiment of the invention the frame is formed by embossing with a beveled surface at that edge which is at the rear as the slide is inserted into the frame.

The advantage afforded by that feature resides in that the slide frame even if it is cambered can be satisfactorily inserted also at the rear edge of the picture gate and that for this purpose the rear edge of the picture gate need not be V-shaped in the plane of one plastic sheet. A camber of the slide frame cannot be precluded in any case.

In a preferred embodiment of the invention, gripping cams are formed by an embossing operation on the inside surface of at least one web portion.

The advantage afforded by that feature resides in that the slide frame is satisfactorily fixed in the picture gate. A hot embossing operation carried out within the scope of the process in accordance with the invention will afford the advantage that the inside and outside surfaces of the slide frame can be designed and shaped independently of each other. During a cold embossing operation any deformation of the sheet on one side will become apparent also on the other side.

The known process can also be used to make a slide frame having a slit which is adapted to be expanded for the insertion of the slide. For this purpose the slide frame made by the known process is formed in one of its components on that side on which the slide is to be inserted with a punched receiving slit, which has the configuration of an inverted U. When it is desired to insert the slide, that slit is expanded by means of expanding pins, which are inserted through bores formed in the other outer component of the frame (see German Patent Specification No. 1,214,898).

In a preferred embodiment of the invention the slide frame is formed with a film-receiving slit, which is adapted to be temporarily expanded for the insertion of the slide, the two components of the frame are left unconnected at one end of the frame so that they define a slit, which extends laterally into the side members of the frame, and the frame is expanded in that wedges are inserted into the slit in the direction in which the slide is to be inserted or from the side edges of the frame.

Compared to the provision of the U-shaped receiving slit, that feature affords the advantage that the two plastic sheets forming the slide frame need not be specially processed to provide a receiving slit so that the two components may be identical. The expanding operation required to expand slide frames made in accordance with the invention has been specifically disclosed in FIGS. 2 and 3 of Austrian Patent Specification No. 276, 804.

In U.S. Pat. No. 2,390,053 of 1945 it has already been disclosed that a slide frame can be made in that two components of cardboard or a similar compressible material are joined. Each component of that frame has been embossed to form one half of the picture gate and an opening for receiving the slide; said picture gate part and said opening merge into each other. To prevent a slipping of the slide out of the slide frame through the receiving opening, two pairs of retaining cams are provided in the receiving opening and substantially contact each other but can adquately yield because they consist of compressible material so that a slide can be inserted into and removed from the frame between said cams.

But plastic is noncompressible. For this reason slide frames of hard, elastic plastic are made by the process described first hereinbefore and in the four decades which have passed since the publication of U.S. Pat. No. 2,390,053 no attempt has been made to use an embossing step in the manufacture of plastic slide frames. Still less have the persons skilled in the art recognized that an embossing step can be used to form only the film bed but not to form the adjoining receiving opening so that the slide frame will be retained in the picture gate in the required orientation without a need for additional structural elements and the slide frame cannot leave the frame through a receiving opening. Nevertheless the advantage which is due to the elasticity of the material of the known slide frames of elastic plastic is retained that there is no need for a receiving opening because a receiving slit is only temprarily expanded when it is desired to insert or remove the slide frame. It is apparent that the invention is the result of the combination of two seemingly conflicting requirements, namely, to provide the elastically expansible receiving slit and to provide the frame with an embossed picture gate, which is preferably closed throughout its periphery. That inventive concept had not been rendered obvious to a person having ordinary skill in the art by the prior art discussed hereinbefore.

In accordance with a second aspect of the invention a slide frame which is preferably adapted to be elastically expanded is made from an extruded sheet plastic web, the picture gates and the external contours of the frames are formed by punching and a film bed which is preferably peripherally closed and serves to receive the slide is formed in the plastic web by embossing, wherein a two-part, preferably two-colored slide frame is made from a single plastic web in that the latter is cyclically advanced by increments corresponding to approximately twice the width of a frame, the picture gates for the top and bottom components are punched out of the plastic web in a first process step, the film bed and the spreadable edge portions are formed by an embossing operation in a second process step, a glueing medium is applied to alternate frame components in a third process step, and the plastic web is intermittently advanced by increments corresponding to approximately the width of one frame through a further processing station, in which the top and bottom components of each frame are successively punched out of the plastic web and are subsequently superimposed and joined to each other.

The advantages afforded by said features reside in that slide frames in which the components are not hingedly connected may be made from a single plastic web. In that case the plant or apparatus for carrying out the process will also be simplified because only one plastic web feeder is required and the need for a second punching press is eliminated. Another advantage of the process resides in that a single punching press is used to form the external contours of the upper and lower components of each slide frame so that said outer contours will be absolutely indentical. The same punching press is also used to join the upper and lower components of each frame and to stack the resulting frames so that the frames can be delivered to the packaging machine as an orderly stack.

In a modification of the process according to the invention the frame components are joined after they have been formed with their external contours.

The advantage afforded by said modification resides in that the upper and lower components of each slide frame can be joined by an adhesive or by ultrasonic welding. A further advantage resides in that the step of joining the upper and lower components of each frame can be performed in any known mounting machine.

In a preferred embodiment of the invention an inwardly directed beveled surface is formed by embossing at least at one edge of the picture gate.

The advantage afforded by that embodiment resides in that each slide can be forced into and arrested in the film bed and will also be gripped in the film bed so that the slide cannot reciprocate in the frame. A third advantage afforded by that process step resides in that the slide will be pretensioned so that popping will be prevented during the projection.

In a preferred embodiment the slide frame is made from a sheet plastic web consisting of three layers.

The advantage afforded by that feature resides in that the plastic web and the slide frames or the slide frame components may have different colors on their top and bottom sides and nevertheless the waste of the intermediate layer of the plastic web can be entirely recycled for reprocessing.

DETAILED DESCRIPTION OF THE PREFERRED EMBODIMENTS

The invention will be explained by way of example with reference to various embodiments shown in the drawing.

Figure 1:
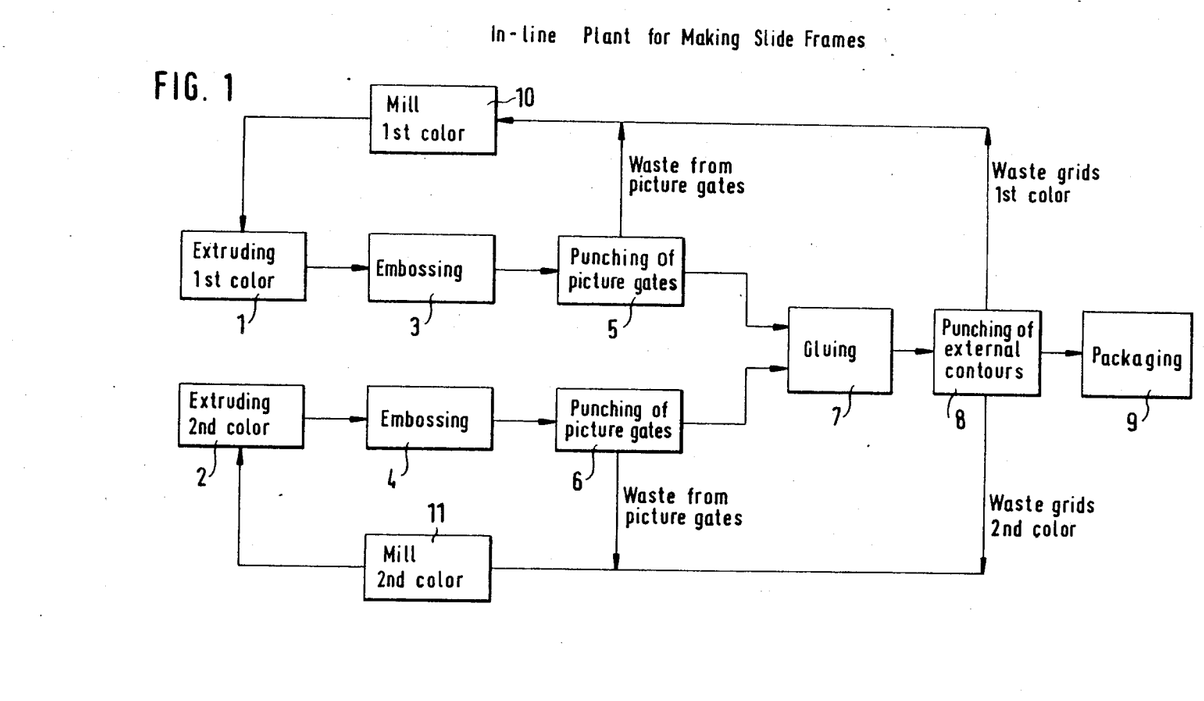
FIG. 1 is a diagrammatic view showing a plant for making slide frames by the process in accordance with the invention.

FIG. 1 shows extruding stations 1 and 2 for extruding respective plastic webs. This permits the slide frame to be made in two colors.

From each extruding station 1 or 2 the plastic web is fed to an embossing station 3 or 4, which is succeeded by a punching station 5 or 6 in which each plastic web is punched to form the picture gates.

The plastic webs are then superimposed and are joined in a gluing station 7. In a modified embodiment which is not shown the plastic webs are joined by ultrasonic welding. In a succeeding processing station 8, which is the last but one processing station, the slide frames are punched from the joined plastic webs and formed with external contours. The finished slide frames are then delivered to a packaging station 9. At that station, sets of slide frames are packaged in shrink films.

The plastic waste obtained by the punching of the picture gate out of each plastic web is supplied to a grinding mill 10 or 11, in which only waste plastic in a single color is recovered. The gridlike waste which becomes available in the processing station 8, in which the slide frames are punched from the joined webs, are similarly processed after the gridlike wastes have been separated in accordance with their colors. The plastic material recovered in the two grinding mills 10, 11 is recycled to the extruding stations 1,2 and is reprocessed therein.

Figure 2:
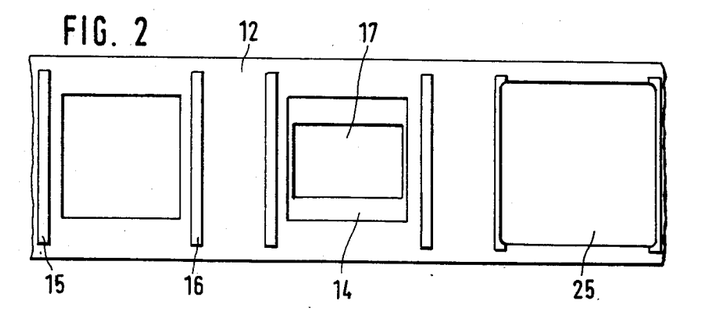
FIGS. 2 to 8 show how the process including a cold embossing step can be carried out in various stations.
Figure 4:
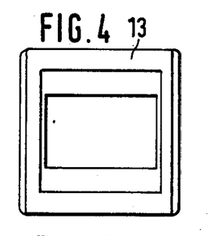
Figure 5:
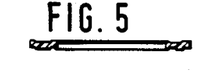

From the plastic web 12 shown in FIG. 2, the upper component 13 is punched, which is shown in FIG. 4 in an elevation and in FIG. 5 in a sectional view. The film bed 14 and the spreadable edge portions 15, 16 are formed by cold embossing. The picture gate 17 is punched out.

Figure 3:
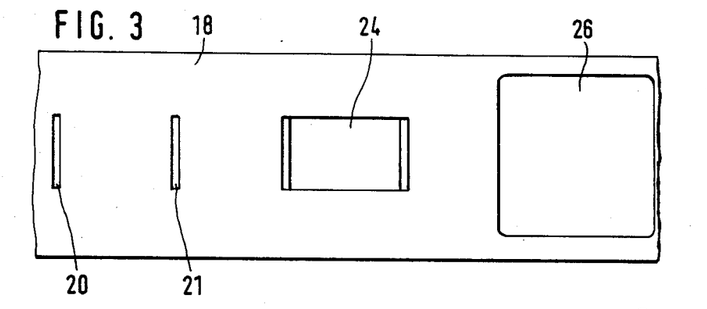
Figure 6:
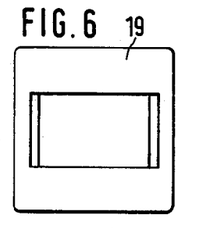

From the plastic web 18 shown in FIG. 3, the lower component 19 of the slide frame is punched. That lower component is shown in an elevation in FIG. 6 and in a sectional view in FIG. 7. The lower component 19 has a smooth outside surface.

Figure 7:
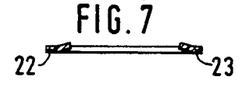

It is apparent from FIG. 3 that the plastic web 18 is formed by cold embossing with film-gripping ribs 20, 21 and with antipopping ribs 22, 23, shown in FIG. 7. The picture gate 24 is punched out.

Figure 8:
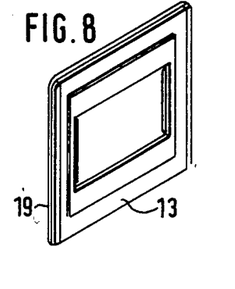

When the plastic webs 12 and 18 have been superimposed and have been joined in the gluing station 7, the slide frames are punched from the composite web. In that operation the rounded external edge portions 25, 26 of the slide frame shown in FIG. 8 are formed at the same time. In FIG. 8 the view is directed to the top component 13 and the smooth bottom component 19 faces away from the eye.

Figure 9:
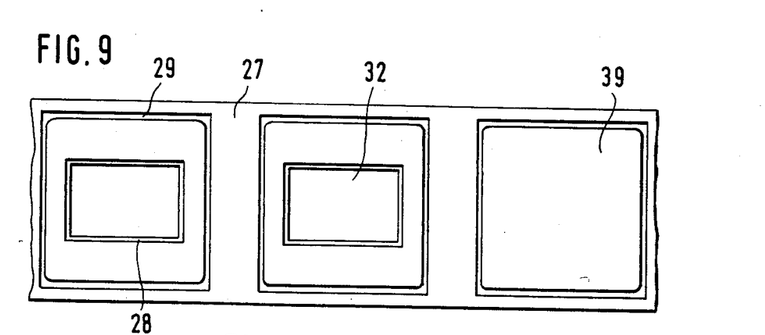
FIGS. 9 to 15 show how the process including a hot embossing step can be carried out in various stations.

Now the hot embossing process will be described, which is performed as follows:

FIG. 9 shows the top surface 27 of a plastic web 30, which is formed in its top surface by hot embossing with a picture gate frame 28 and with a raised edge portion 29 having radiused inner corners. Any desired script may also be engraved by hot embossing. The upper component 31 of the slide frame is made from the plastic web 30 and is shown in a top plan view on its top outside surface in FIG. 12. The picture gate 32 is punched out.

Figure 10:
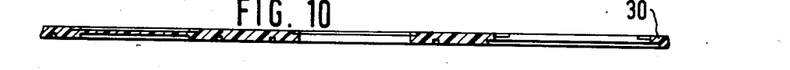

FIG. 10 is a sectional view showing the plastic web 30.

Figure 11:
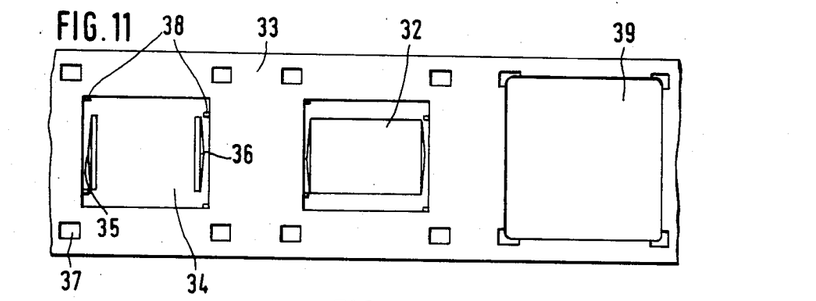
Figures 12, 13, 14, 15:
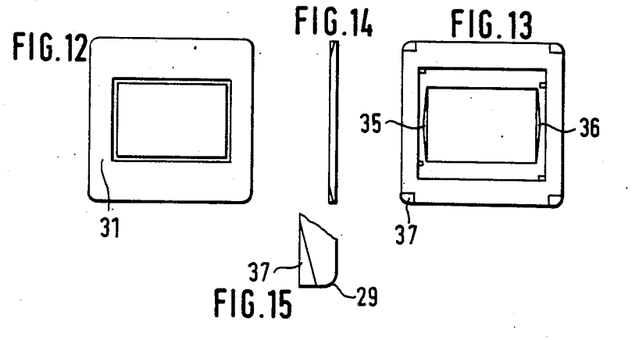

FIG. 11 shows the bottom surface 33 of the plastic web 30. That bottom surface will constitute the inside surface of the top component of the slide frame. In the first processing station shown in FIG. 11 a hot embossing operation is performed to form a film bed 34, two mutually opposite beveled surfaces 35, 36 for facilitating the insertion of the slide, four expanding notches, one of which is designated 37, and four film-gripping elements, two of which are designated 38. The expanding notches are also shown in FIG. 13 and on a larger scale in FIG. 15. They permit the introduction and actuation of the wedges, not shown, which are used in accordance with claim 13 for expanding the slit for the insertion of the slide.

In the next processing station the picture gate 32 is punched out of the plastic web 30. Thereafter the plastic web 30 and a second plastic web, which is not shown and is preferably identical to the plastic web 30, are superimposed with confronting inside surfaces and are joined by gluing or ultrasonic welding. It is diagrammatically represented in FIG. 1 that the plastic webs are combined. In a further processing station the slide frame is punched out of the composite web in such a manner that the external edge portions 39 of the slide frame are formed at the same time.

Figure 16:
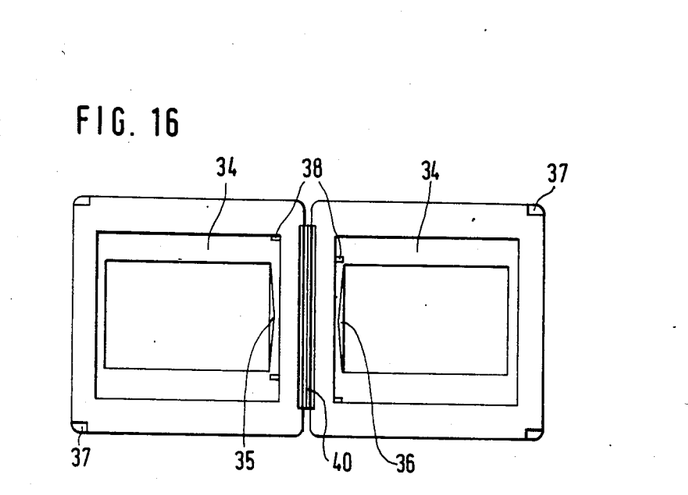
FIG. 16 shows a hinged frame made by the process illustrated in FIGS. 9 to 15, which frame is shown in a open state.
Figure 17:
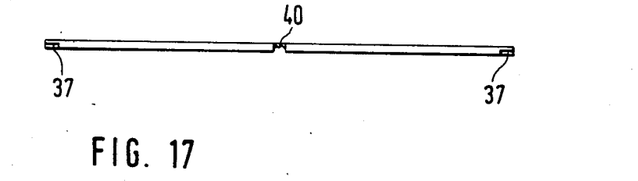
FIGS. 17 is a top plan view on a longitudinal edge of the frame shown in FIG. 16.

FIG. 16 shows a hinged frame which has been made by the process in accordance with the invention. The components of that frame are made by the process steps explained hereinbefore and the hinge 40 is made by hot embossing. The film bed is designated 34, V-shaped beveled surfaces for inserting the slide are designated 35, 36 a spreading notch is designated 37 and the cams for gripping the film are designated 38.

As has been mentioned hereinbefore the hot embossing performed in the manufacture of the slide frames affords the advantage that all contours and engraved script which can be provided in a slide frame by injection molding can be made and that the slide frames can be made at a high production rate in a compact plant requiring only low labor costs. In order to reduce the pressures required for a deformation by hot embossing it will be desirable so to design the slide frame that only small quantities of material must be displaced. A process of manufacturing such slide frame is illustrated in FIGS. 18 to 27.

Figure 18:
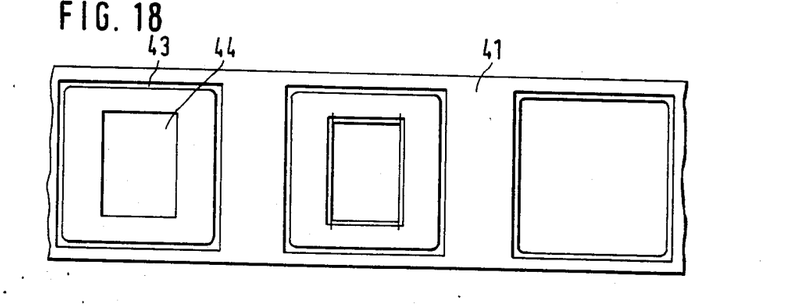
FIGS. 18 to 27 illustrate a modification of the process using hot embossing
Figure 19:
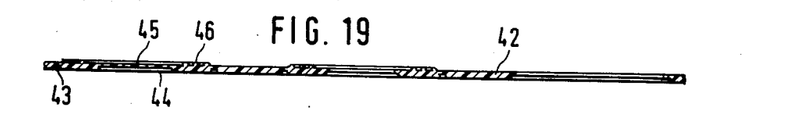
Figure 20:
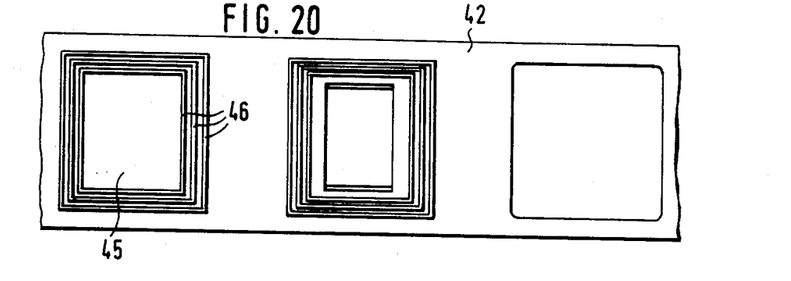

FIG. 18 shows the upper surface 41 of the plastic web 42 used to make the upper components of the slide frames. In the first station that web is embossed to form the raised peripheral edge portion 43, the frame 44 surrounding the picture gate, the film bed 45 and the spacing ribs 46. FIG. 19 is a sectional view showing the plastic web 42.

Figure 25:
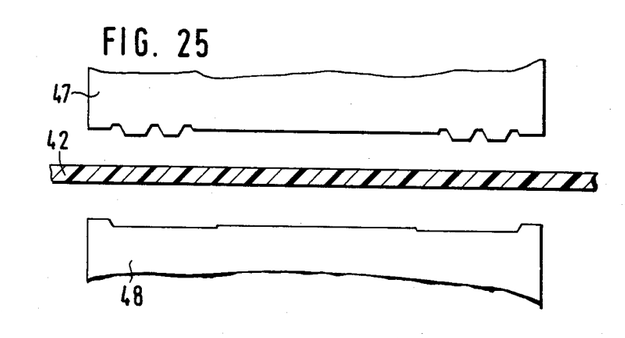
Figure 26:
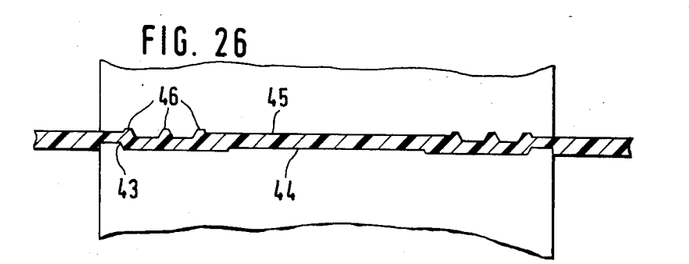
Figure 27:
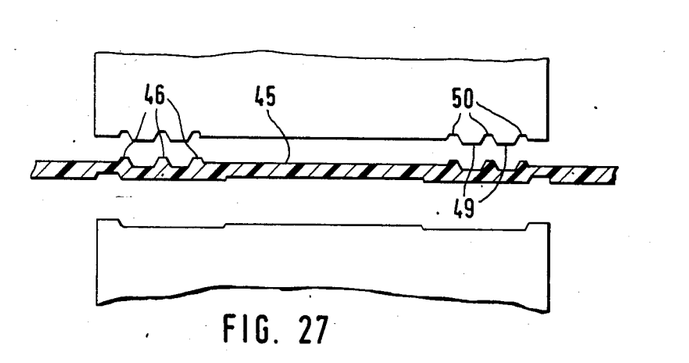
Figure 28:
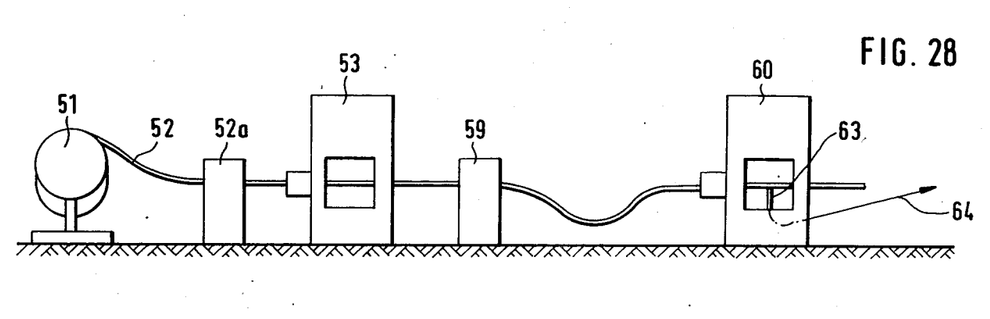
FIG. 28 is a side elevation showing apparatus for carrying out the process in accordance with the second aspect of the invention.

The embossing operation is illustrated on a larger scale in FIGS. 25, 26 and 27.

The embossing punch 47 is used to shape the inside contours of the slide frame and the embossing die 48 is used to shape the outside contour.

As has been mentioned hereinbefore the embossing punch 47 used in that hot embossing process is so shaped that the material displaced by the protruding ribs 49 will flow into suitable grooves 50 so that the spacing ribs 46 will be formed in the plastic web 42. The innermost spacing rib will define the film bed and the outermost spacing rib will define the inner boundary of the expansible slit.

Figure 21:
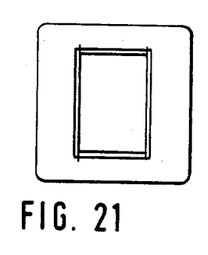
Figure 22:
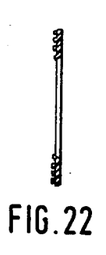
Figure 23:
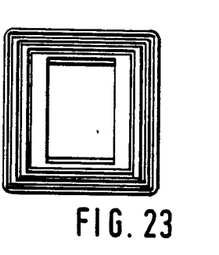
Figure 24:
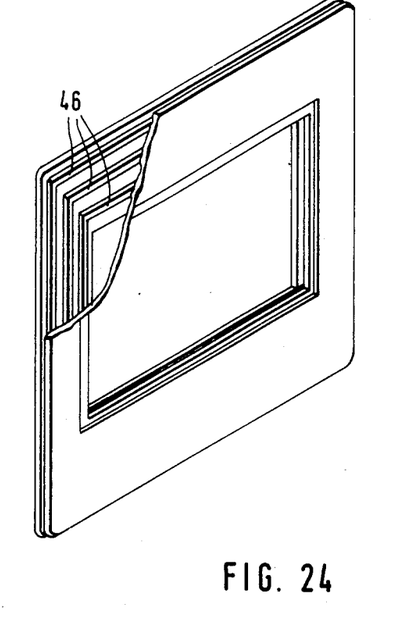

The process of manufacturing the slide frames is then continued in the manner described hereinbefore. FIG. 21 shows the upper surface of a slide frame. FIG. 22 is a sectional view showing the upper component of the slide frame. FIG. 23 shows the inside surface of the upper component of the slide frame. FIG. 24 shows a complete slide frame in which the top and bottom components have been adhesively joined.

In the embodiment shown in FIGS. 28 to 31 the unwinding machine 51 is operated to intermittently advance an extruded web 52 of elastic plastic material. That web is first supplied to a printing press 52a and thereafter to an automatic punching press 53.

Figure 29:
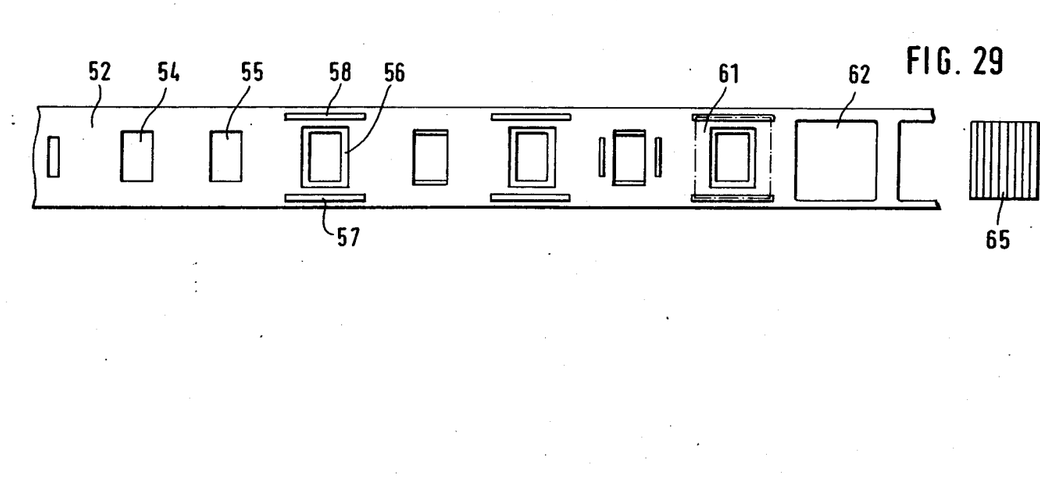
FIG. 29 is a top plan view showing the plastic web as it is processed in the apparatus of FIG. 28.

As is best apparent from FIG. 29 the plastic web 52 is advanced in each feeding step approximately by twice the width of each frame so that the picture gates 54 and 55 for an upper component and a lower component of the slide frame can be punched by the automatic punching press 53 in a single cycle. The film bed 56 and the spreadable edge portions 57, 58 are formed by embossing in a second cycle. When the web has been passed through a suction device, not shown, and has been cleaned therein, it is moved in a third cycle through a solvent dispenser 59, solvent is applied to alternate frame components. The solvent dispenser is also provided with a suction device, not shown, which serves to clean the web. The plastic web 52 is then supplied to a second automatic punching press 60 in feed increments corresponding to about one frame width. In that automatic punching press 60 a single punch shaped in accordance with the external contour of the frame is operated to punch out an upper component 61 and a lower component 62 in succession. The automatic punching press 60 also comprises a wall 63, which is disposed below the die and in which the lower and upper components of each slide frame are superimposed and joined. The resulting slide frames are stacked and in an ordered arrangement are delivered in the direction of the arrow 64 to a packaging machine indicated at 65 in FIG. 29.

In the embodiment just described of the process in accordance with the invention the application of a solvent after the punching operation performed by the automatic punching press 53 can be eliminated so that the components of each frame are not joined in the automatic punching press 60 but are only stacked therein in an orderly arrangement. In that case the components of each frame are joined after their external contours have been formed, i.e., after the second automatic punching press 60, e.g., in a mounting apparatus, in which the two components of each frame may be joined by ultrasonic welding, if desired.

The embossing operation by which an inwardly directed beveled surface is formed at least at one edge of a picture gate is performed during the same cycle in which the previously described surfaces formed by embossing are provided.

FIG. 29 shows a packaging machine 65, which is provided with a stacking apparatus.

Figure 30:
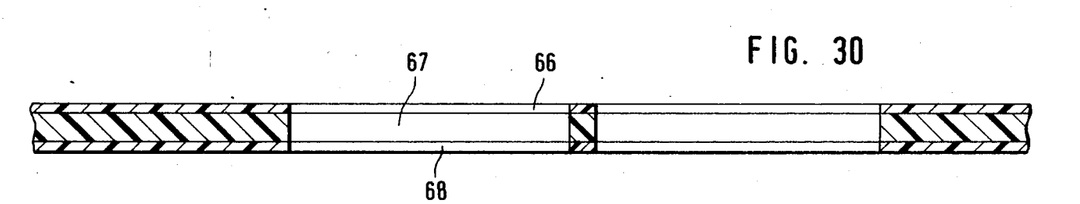
FIG. 30 is a fragmentary sectional view showing a portion of a plastic web.

It is apparent from FIG. 30 that the plastic web is composed of three layers 66, 67 and 68. One outer layer 66 is made, e.g., from blue plastic and the other outer layer 68 is made, e.g., of green plastic so that waste material in different colors can be recycled to form the intermediate layer 67.

Figure 31:
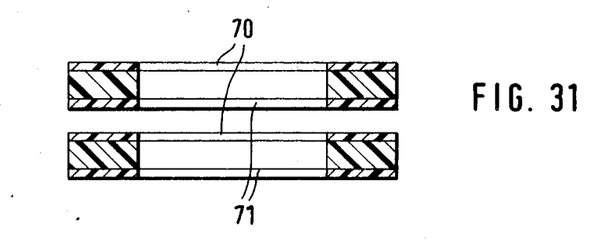
FIG. 31 is a sectional view showing two superimposed components of a slide frame.

The two-part slide frame is diagrammatically shown in FIG. 31, which indicates that the upper component 61 and lower component 62 punched from the plastic web 52 can be superimposed in such a manner that the frame components and the frame composed of said components have a blue top surface 70 and a green bottom surface 71.

A further advantage afforded by the invention resides in that the punch for shaping the external contours is also used to join the components of the frame.

The frame is specially designed with antipopping ribs for gripping the film. The gripping of the films serves two purposes:

1. The film is fixed in position in the frame. This is accomplished in that the film bed is constricted and the film is gripped on two sides of the picture gate boundaries.

2. The gripping imparts to the film an initial camber so that an antipopping effect is achieved. The antipopping ribs are emphasized in the various figures.

We claim:

1. A process of manufacturing slide frames, which are adapted to be elastically expanded comprising the steps of:
   providing at least one extruded plastic sheet plastic web;
   forming a film bed from said plastic web, which is peripherally closed and which serves to receive a slide, by embossing;
   punching said plastic web to form picture gates;
   joining plastic web portions of said web by either gluing or ultrasonic welding to form a frame; and
   punching said joined webs to form the external contour of the frame.

2. A process according to claim 1 characterized in that the step of extruding of the plastic web or webs is directly succeeded by the embossing operation to form the film bed.

3. A process according to claim 1, characterized in that two sheet plastic webs are extruded and the embossing to form the film bed in succeeded by a punching operation to form the picture gates, the two plastic webs are subsequently joined, and the external contour of the frame is subsequently formed by another punching operation.

4. A process according to claim 1, characterized in that a single plastic web is extruded and is subsequently embossed to form the film bed and a film hinge connecting two components of the frame, and the picture gates and the external contour of the frame are subsequently formed concurrently by punching.

5. A process according to claim 1, characterized in that the film bet is formed by cold embossing.

6. A process according to claim 1, characterized in that the film bed is formed by hot embossing.

7. A process according to claim 6, characterized in that the external contour is formed with rounded corners by an embossing operation.

8. A process according to claim 6, characterized in that an edge of a picture gate is formed by embossing.

9. A process according to claim 6, characterized in that a script is formed by embossing.

10. A process according to claim 6, characterized in that the frame is formed by embossing with a beveled surface at an edge which is at the rear such that the slide is adapted to be inserted into the frame.

11. A process according to claim 6, characterized in that gripping cams are formed by an embossing operation on an inside surface of at least one web portion.

12. A process according to claim 1, characterized in that the frame is formed with a notch and/or an aperture at least at a film-receiving end of the frame in order to facilitate the insertion of a slide into the frame.

13. A process of manufacturing a slide frame according to claim 1, in which the frame is formed with a film-receiving slit, which is adapted to be temporarily expanded for the insertion of the slide, characterized in that two components of the frame are left unconnected at one end of the frame so that said two components define a slit, which extends laterally into side members of the frame, and the frame is expanded by insertion of wedges into the slit in a direction in which the slide to be inserted or from the side edges of the frame.

14. A process according to claim 1 characterized in that antipopping ribs are formed on two opposite sides of a picture gate boundary.

15. A process according to claim 1 characterized in that the film bed and a film hinge are formed by hot embossing.

16. A process of manufacturing a slide frame, which is adapted to be elastically expanded, from an extruded sheet plastic web, wherein the picture gates and the external contours of the frames are formed by punching and a film bed which is peripherally closed and serves to receive the slide is formed in the plastic web by embossing, characterized in that a two-part, slide frame is made from a single plastic web in that the latter is cyclically advanced by increments corresponding to approximately twice the width of a frame, the picture gates for the top and bottom components are punched out of the plastic web in a first process step, the film bed and spreadable edge portions are formed by an embossing operation in a second process step, gluing medium is applied to alternate frame components in a third process step, and the plastic web is intermittently advanced by increments corresponding to approximately the width of one frame through a further processing station, in which the top and bottom components of each frame are successively punched out of the plastic web and are subsequently superimposed and joined to each other.

17. A process according to claim 16, characterized in that the frame components are joined after they have been formed with their external contours.

18. A process according to claim 16, characterized in that one component of the frame is printed upon before the external contour of the frame is formed by punching.

19. A process according to claim 16, characterized in that an inwardly directed beveled surface is formed by embossing at least at one edge of the picture gate.

20. A process according to claim 16, characterized in that the slide frame is made from a sheet plastic web consisting of three layers.

21. A process according to claim 16, wherein the slide frame formed is two-colored.

* * * * *